D. H. McGOGY.
AUTOMATIC TEMPERATURE REGULATOR FOR ELECTRICALLY HEATED DEVICES.
APPLICATION FILED MAY 3, 1919.
1,374,935.
Patented Apr. 19, 1921.
3 SHEETS—SHEET 1.
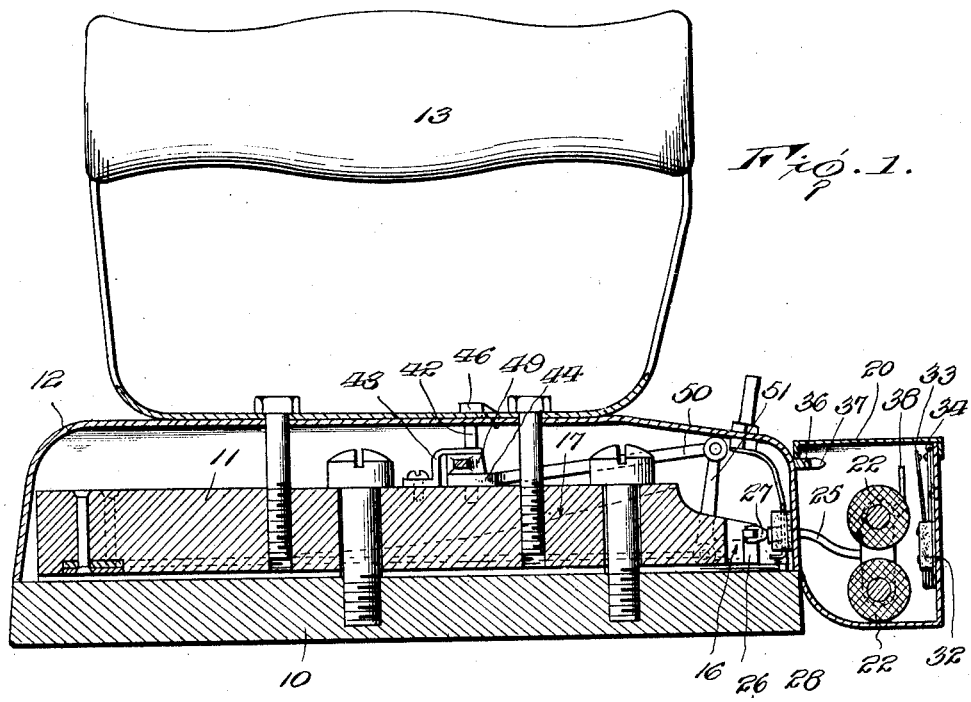
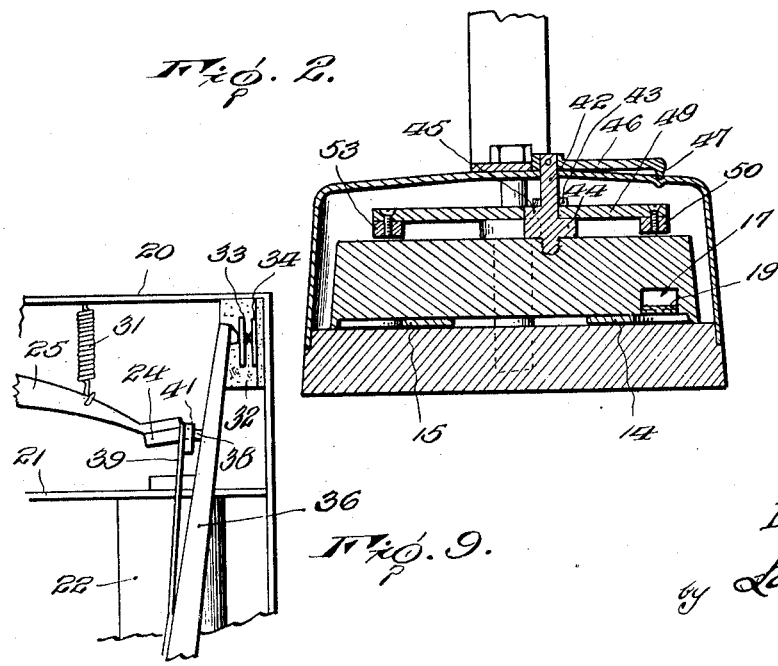
INVENTOR.
D. H. McGogy.

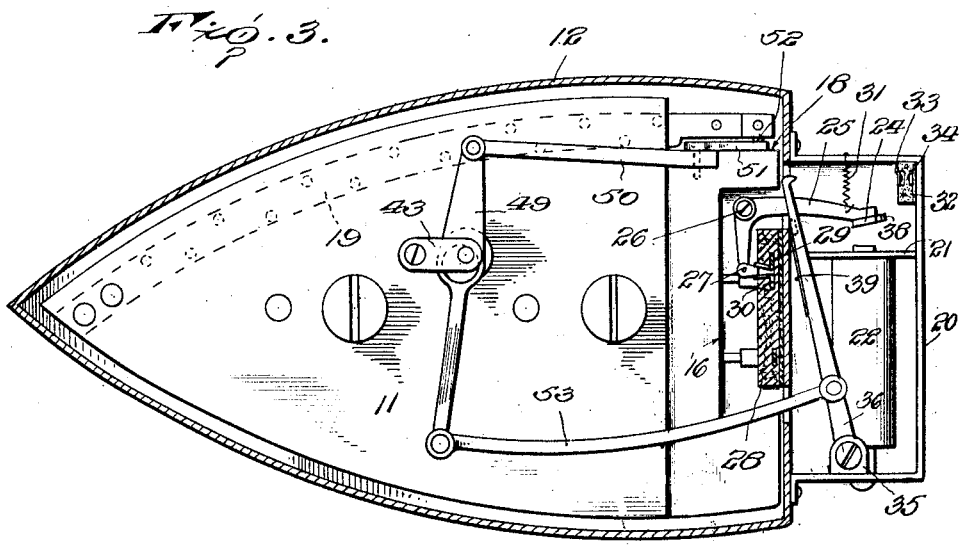

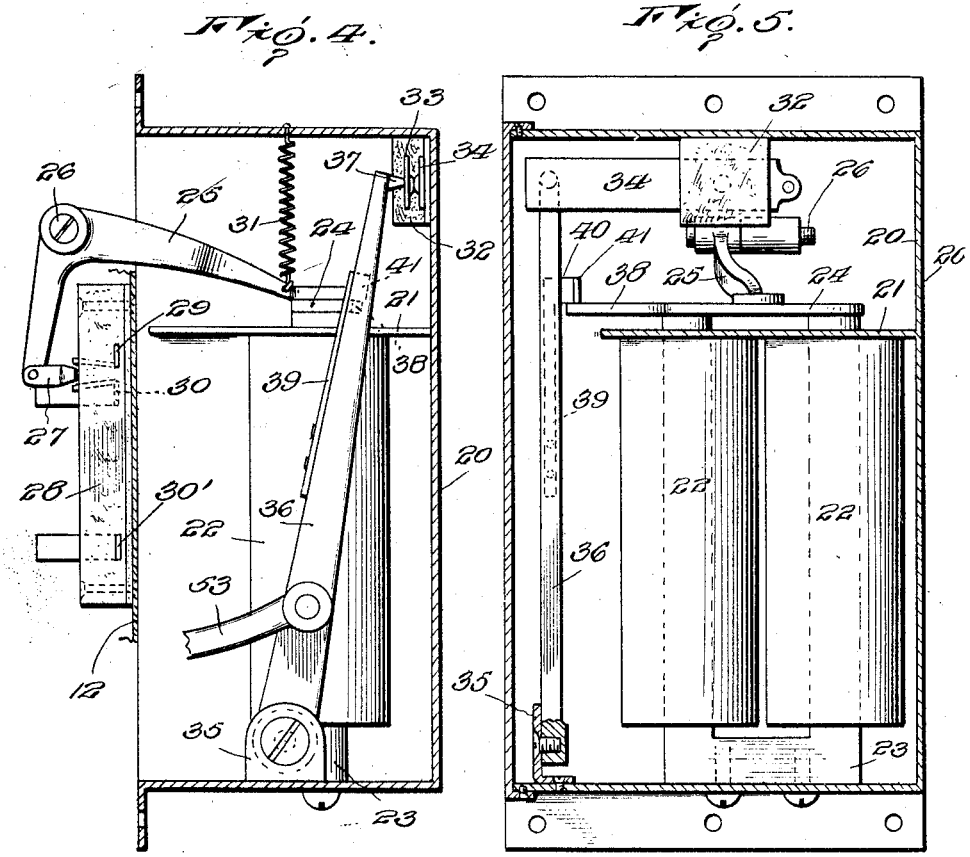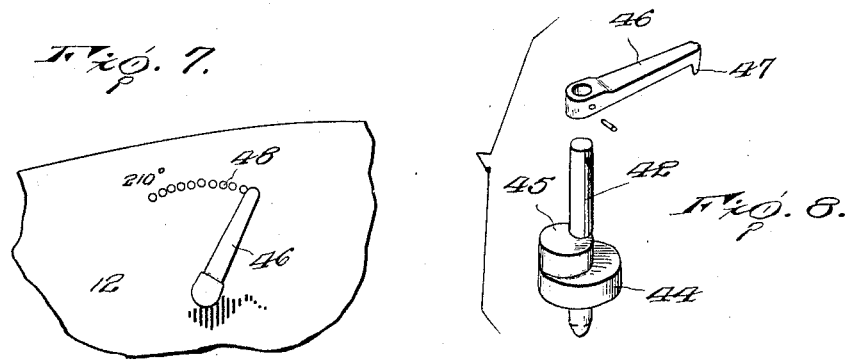

UNITED STATES PATENT OFFICE.

DONALD H. McGOGY, OF PORTLAND, OREGON.

AUTOMATIC TEMPERATURE-REGULATOR FOR ELECTRICALLY-HEATED DEVICES.

1,374,935.  Specification of Letters Patent.  Patented Apr. 19, 1921.

Application filed May 3, 1919. Serial No. 294,390.

*To all whom it may concern:*

Be it known that I, DONALD H. McGOGY, citizen of the United States, residing at Portland, in the county of Multnomah and State of Oregon, have invented certain new and useful Improvements in Automatic Temperature-Regulators for Electrically-Heated Devices, of which the following is a specification.

This invention relates to an improved automatic temperature regulator for electrically heated devices and has as one of its principal objects to provide a simple and dependable mechanism whereby the temperature of the device being heated will be automatically controlled.

The invention has as a further object to provide a regulator wherein the flow of current to the heating device will be positively controlled by a main contact switch which will be automatically operated relative to the temperature of the device.

A further object of the invention is to provide a regulator employing electromagnets for operating the positive main switch and wherein said magnets will be included in a shunt circuit in turn controlled by the thermostat employed for governing the actuation of said switch.

A further object of the invention is to provide a regulator wherein the main switch will, upon being opened, be locked open and wherein the locking device for said switch will be under the control of the thermostat so that not until the device being heated has cooled sufficiently, will said locking device be released and the main switch again closed.

And the invention has as a still further object to provide a regulator wherein the maximum temperature at which the flow of current to the device being heated will be cut off, may be adjustably varied.

Other and incidental objects will appear hereinafter. In the drawings:

Figure 1 is a longitudinal sectional view showing my improved regulator applied to an electric iron,, Fig. 2 is a transverse sectional view particularly showing the mounting of the control lever of the device and associated parts, Fig. 3 is a horizontal sectional view particularly illustrating the mounting of the main switch lever and the connections between the thermostat of the regulator and the arm employed for closing the switch of the shunt circuit controlling the magnets operating the main switch, Fig. 4 is a transverse sectional view taken through the magnet box of the regulator, the box and associated parts being detached from the iron, Fig. 5 is a sectional view taken through the magnet box at right angles to Fig. 4, Fig. 6 is a diagrammatic view more particularly showing the wiring system employed in connection with the regulator, Fig. 7 is a detail plan view of the control lever of the device, this view particularly bringing out the manner in which said lever may be adjustably set for substantially maintaining the iron at a given maximum temperature, Fig. 8 is a detail perspective view showing the lever and its supporting shaft or post detached, Fig. 9 is a fragmentary sectional view similar to Fig. 4, this view showing the positions of the parts at the instant of closing of the secondary switch employed, and Fig. 10 is a detail elevation particularly illustrating the main switch contacts employed.

Referring now more particularly to the drawings, I have arbitrarily chosen to show my improved regulator in connection with an electric iron and will so describe the invention since a most urgent demand now exists for a simple and dependable regulator for this class of devices. However, I do not wish to be limited in this regard since, as will appear as the description proceeds, the regulator is well adapted for general use in connection with electrically heated devices of other types.

The bottom plate of the iron is indicated at 10. Secured to this bottom plate is a top plate 11 and secured over the top plate is the shell 12 of the iron, this shell resting at its bottom edge upon the bottom plate. A handle 13 is connected with the shell. Suitable coils which, for convenience, have been indicated at 14 and 15 respectively, are interposed between the top and bottom plates, these coils being each wrapped about a core of approved type and occupying the relative positions shown in Fig. 6, the front ends of the coils being connected. At its rear end the top plate 11 is formed with an oblong notch or recess 16 and also formed in this plate adjacent one side thereof is a longitudinally curved recess 17 opening through the bottom face of the plate and which, as shown by dotted lines in Fig. 1, gradually increases in depth from the front end of the plate toward its rear end. At its rear end, the recess 17 opens into a notch 18 formed in the reduced rear end portion of the top plate at one corner thereof and mounted within said recess is a longitudinally curved thermostat 19. This thermostat is secured at its forward end preferably by spaced fastening devices connecting the thermostat with the top plate 11 and is constructed of superimposed strips of metal secured together. These metal strips have unequal coefficients of expansion and the strip having the greater coefficient is arranged beneath the other strip so that when the thermostat is subjected to heat radiating from the heating coils as well as from the plates of the iron, the free end portion of the strip will move upwardly within the recess 17. However, the thermostat will normally lie flat against the bottom plate 10 and, at its free end, projects into the notch 18.

Suitably connected to the rear end of the shell 12 of the iron is a magnet box or casing 20 which, as best shown in Figs. 1 and 5, is preferably closed by a removable cover. Projecting into the casing adjacent one end thereof is a transverse partition 21 and mounted within the casing are electromagnets 22 provided with a substantially U-shaped core 23. The arms of this core project through the partition 21 and carry the magnet coils while the connecting portion of the core is screwed or otherwise secured to one end wall of the casing for supporting the magnets within the casing. Arranged to coöperate with the magnets is an armature 24 carried by a bell crank 25. This bell crank is mounted to rock upon a post 26 upstanding within the notch 16 from the bottom plate 10 of the iron. The bell crank is provided with a long arm and a short arm. The long arm extends into the casing 20 and carries the armature 24 while at its outer end, the short arm carries a laterally and outwardly directed main switch contact 27. Mounted upon the shell 12 of the iron at the rear of the short arm of the bell crank and within the notch 16, is a block of insulating material 28 and preferably a strip of mica is arranged between the block and the shell. Embedded in this block are main switch contacts which, for convenience, have been indicated at 29 and 30 respectively, having oppositely disposed spring fingers projecting forwardly through the block. As particularly shown in Figs. 3 and 4, the contact 27 is adapted to engage between said fingers for closing a circuit therethrough. The contact 29 projects through the upper edge of the block and receives one end of a conductor leading from a suitable contact post upstanding from the shell at its rear end while the contact 30 extends below the block and is provided with a laterally directed foot. The block 28 also carries a contact 30' which extends through the block in spaced parallel relation to the contacts 29 and 30. At its upper end the contact 30' receives a conductor leading from a second contact post upstanding from the shell adjacent the first post mentioned, while at its lower end said contact is provided with a laterally directed foot similar to the foot of the contact 30. The contact posts are, of course, designed to receive the socket of an ordinary extension cord as will be well understood. Connected with the free end portion of the long arm of the bell crank 25 is a spring 31 secured to the adjacent end wall of the casing 20 and adapted to actuate the bell crank for normally maintaining the main switch closed. Secured within the angle between the outer side wall of the casing and the adjacent end wall thereof is an insulating block 32 in which are embedded at their lower end portions spring contacts which, for convenience, have been indicated at 33 and 34 respectively. These contacts are insulated with respect to each other and preferably a strip of mica is arranged beneath the block to extend between the contact 34 and the adjacent wall of the casing. The free upper end portions of said contacts upstand within the box above the plane of the uppermost of the magnets 22. These contacts provide a secondary switch controlling a shunt circuit as will be later explained. Projecting inwardly from the end wall of the casing 20 remote from the contacts 33 and 34, is an angle plate 35 upon which is pivoted a horizontal switch closing arm 36. At its free end this arm is provided with a laterally and outwardly directed stud or projection 37 adapted to engage the spring contact 33 for flexing this contact into engagement with the contact 34 for closing the secondary switch. In connection with this arm 36 I provide a locking device for maintaining the main switch open after the magnets 22 have been deënergized, it being observed that in the absence of such locking device, the spring 31 would immediately close the main switch. Projecting from the upper end of the armature 24 is an outwardly offset upstanding arm 38 and secured to the inner longitudinal edge of the arm 36 is a locking member 39 proper. This locking member is preferably formed from a strip of suitable resilient sheet metal suitably secured adjacent one end of the arm 36 and provided at its free end with a depending head 40 at the lower end of which is formed a laterally and outwardly directed lug 41 extending at substantially right angles to the head beneath the arm. As particularly brought out in Figs. 4 and 5 of the drawings, this lug will, when the arm 36 is shifted to close the secondary switch, be moved to a position in the rear of the free end of the arm 38 of the armature 24. Consequently, as long as the arm 36 remains in a position to support the lug 41 in the path of the arm 38, the long arm of the bell crank 25 will be held against retraction and the main switch will thus be locked open. On the other hand, inward movement of the free end of the arm 36 will, as will be clear, serve to shift the lug 41 from engagement with the arm 38 of the armature so that the bell crank will thus be freed when the main switch will be immediately closed.

Journaled at its lower end upon the top plate 11 of the iron is a medially located vertical shaft or post 42, this post however, being disposed at one side of the longitudinal center of the iron. Supporting the post in upright position is a bracket 43. As shown in detail in Fig. 8, the post carries, adjacent its lower end, a disk or shoulder 44 and formed on the upper side of said disk is an eccentric 45. At its upper end, the shaft projects through the shell 12 and keyed or otherwise secured to the upper terminal of the shaft exteriorly of the shell is a control lever 46 provided at its free end with a depending lug 47 adapted to selectively engage in an arcuate series of indentations 48 formed, as shown in detail in Fig. 7, in the upper face of the shell. These indentations are respectively identified by readings indicating degrees Fahrenheit. Journaled at a point adjacent one end around the eccentric 45 of the post 42 is a rocker arm 49 held between the bracket 43 and disk 44. Pivotally connected at one end to the shorter end of this arm is a link 50 pivotally connected at its opposite end to the longer upstanding arm of a bell crank lever 51. The bell crank 51 is, as particularly shown in Fig. 3, pivoted upon the longitudinal side wall of the notch 18 of the top plate 11 of the iron and freely engaging with the outer end of the shorter arm of said bell crank is a pin 52 fixed to the outer end of the thermostat 19. Extending between the longer end of the rocker arm 49 and the inner end portion of the switch closing arm 36 is a longitudinally curved link 53 pivotally connected at its ends with said arms. Thus, as will be seen, the thermostat is operatively connected at its free end with the switch closing arm for actuating said arm.

In Fig. 6 I have diagrammatically shown the wiring system employed in connection with the regulator. A main feed conductor 54 leads, as previously indicated, from one of the contact posts upon the shell 12 of the iron and is connected to the main switch contact 29. A conductor 55 leads from the rear end of the coil 14 and, at its free end, is provided with a rebent portion forming a contact spring coacting with the foot of the main switch contact 30. Leading from the rear end of the coil 15 is a conductor 55' also provided at its free end with a rebent portion forming a contact spring coacting with the foot of the contact 30' while, as also previously indicated, a main feed conductor leads from the other of the contact posts upon the shell 12 and is connected to the upper end of the contact 30'. A shunt circuit wire 57 is connected at one end with the main switch contact 30 and at its opposite end with the magnets 22. A wire 58 leads from the magnets to the contact 33 of the shunt circuit switch while a wire 59 leads from the contact 34 of this switch and is connected with one of the intermediate turns of the coil 14.

When the control lever 46 is set to engage in the extreme indentation of the series 48, as shown in Fig. 7, the several parts of the regulator will normally occupy the relative positions particularly shown in Fig. 3. The switch contact 27 is, of course, normally engaged between the switch contacts 29 and 30 so that the main switch of the regulator will be closed. Consequently, when the iron is connected up as in ordinary practice and the current is turned on for heating the iron, the current will flow through the wire 54, through the main switch, the wire 55, the coils 14 and 15, the wire 55', and the wire 56. The coils will thus be heated in the usual manner for heating the plates of the iron. As the temperature of the iron is then raised, the free end of the thermostat will, in the manner previously described, move upwardly within the recess 17 for accordingly elevating the short arm of the bell crank 51 and rocking the long arm thereof rearwardly. The arm 49 will in turn be rocked upon the shaft 42 to swing the switch closing arm 36 outwardly. Therefore, when the temperature of the iron has increased sufficiently, the arm 36 will, in the manner shown in Fig. 4, be moved to engage at its free end with the contact 33 of the secondary switch for closing this switch as also previously described. Coincident with the closing of this secondary switch a portion of the current will then flow through the shunt circuit or, in other words, from the main switch contact 30 through the wire 57, through the coils 22, the wire 58, the secondary switch, and the wire 59 to the coil 14. Thus, closing of the secondary switch by the arm 36 will immediately result in energization of the magnets 22 to attract the armature 24 and, as shown in Fig. 4, rock the bell crank 25 to withdraw the switch contact 27 from between the fingers of the contacts 29 and 30 and open the main switch. Accordingly, flow of current to the coils 14 and 15 will be automatically cut off.

It is now to be observed that as the arm 36 is swung outwardly for closing the secondary switch, the lug 41 will encounter the upper end of the arm 38 upon the armature 24. However, since the locking member 39 is resilient, this locking member will flex under continued outward movement of the arm so that the arm may, as shown in Fig. 9, consequently be advanced for closing the secondary switch. Then upon the closing of this switch and the attraction of the armature 24 by the electromagnets, the arm 38 will be caused to ride over the lug 41 and, when the arm clears the lug, the locking member will, as will be seen, snap back into its normal position seating flat against the inner edge of the arm 36 so that the lug 41 will thus be moved to a position behind the arm 38 of the armature for locking this arm against retraction, and as previously described, locking the main switch open. The main switch will remain so locked in open position until the iron has cooled sufficiently to allow the thermostat 19 to contract for retracting the arm 36, as will now be readily understood, and shifting the lug 41 of the locking member out of engagement with the arm 38 of the armature. The armature will then be freed so that the spring 31 will immediately act to rock the bell crank 25 and close the main switch for again turning on the current. It will thus be seen that the regulator will operate automatically to maintain the iron at substantially an even temperature, the circuit through the heating coils being normally closed at the main switch of the regulator but this switch being under the direct control of the thermostat to be opened thereby when the iron has reached a sufficient temperature and to also be closed thereby when the iron has again cooled in proper degree. In this connection, the important function of the locking member 39 is to be particularly noted. In the absence of this member it will be seen that control of the main switch by the thermostat would be lost since the switch would remain open only as long as the magnets 22 were energized and this would be but instantaneous since energization of these magnets would result in opening the main switch to break the shunt circuit. However, by employing the locking member 39, I provide a construction whereby the main switch will be automatically locked in open position incident to the energization of the magnets and coincident with the opening of said switch and, as just previously described, the main switch will remain thus locked in open position until the arm 36 is positively retracted by the thermostat upon proper cooling of the iron.

Attention is now particularly directed to the manner in which the maximum temperature of the iron may be controlled or varied, and in this connection particular reference will be had to Figs. 3, 7 and 8 of the drawings. When the control lever 46 is set to the position shown in Fig. 7, the several parts of the regulator will, as previously indicated, occupy the relative positions shown in Fig. 3 and the regulator will be set to open the main switch, as previously described, when the iron reaches a maximum temperature consistent with safety. However, it will be seen that by returning the lever 46 to selectively engage the lug 47 of said lever in the series of indentations 48, the shaft 42 will be rotated and the eccentric 45 shifted in such manner that the pivotal center of the rock arm 49 will be moved toward the rear end of the iron. Since the shorter end of this arm is tied by the link 50, rotation of the eccentric will result in positioning the switch closing arm 36 toward the contact 33 of the secondary switch or what may be termed toward the active position of this arm closing the secondary switch. When the control lever 46 is thus set, it will be seen that the arm 36 will have less distance to travel before closing the secondary switch. Consequently, the thermostat 19 must only be raised a proportionate distance for shifting the arm 36 to its active position so that the main switch will be opened at a corresponding lower temperature of the iron. Thus, by manipulating the lever 46, the regulator may be manually set to cut off flow of current through the iron at any particular maximum temperature desired. The iron may thus be heated so as to prove entirely effective for accomplishing the particular work in hand while, at the same time, overheating of the iron with possible attendant hazardous results will be positively overcome.

Having thus described the invention, what is claimed as new is:

1. A temperature regulator for electrically heated devices including a thermostat, a main current controlling switch, a shunt circuit controlled by said switch, a secondary switch in the shunt circuit, electrically actuated means controlled by the shunt circuit for opening the main switch, means associated with said first mentioned means and normally holding the main switch closed, and means operable by the thermostat for closing the secondary switch.

2. A temperature regulator for electrically heated devices including a thermostat, a main current controlling switch, a shunt circuit controlled by said switch, a secondary switch in the shunt circuit, electrically actuated means controlled by the shunt circuit for opening the main switch, means associated with said first mentioned means and normally holding the main switch closed, means operable by the thermostat for closing the secondary switch, and means associated with said last mentioned means and adapted to coact with said first mentioned means for temporarily locking the main switch open.

3. A temperature regulator for electrically heated devices including a main current controlling switch normally held closed, a thermostat, electrically governed means under the control of the thermostat for opening said switch, and means controlled by the thermostat for locking the main switch open.

4. A temperature regulator for electrically heated devices including a main current controlling switch normally held closed, a thermostat, electrically governed means under the control of the thermostat for opening said switch, and locking means also under the control of the thermostat for temporarily retaining the switch open.

5. A temperature regulator for electrically heated devices including a main current controlling switch normally held closed, a thermostat, electrically governed means under the control of the thermostat for opening said switch, means for locking the main switch open, and means for varying the instant of opening of the switch with respect to the movement of the thermostat.

6. A temperature regulator for electrically heated devices including a main current controlling switch normally held closed, a thermostat, electrically governed means under the control of the thermostat for opening said switch, means controlled by the thermostat for locking the main switch open, and controlling means adjustable for governing the opening of the switch at different maximum temperatures.

7. A temperature regulator for electrically heated devices including a main current controlling switch normally held closed, a thermostat, electrically governed means for opening said switch, means under the control of the thermostat governing the actuation of said first mentioned means to open the switch, and means carried by said last mentioned means to coact with said first mentioned means for temporarily locking the main switch open coincident with the opening thereof.

8. A temperature regulator for electrically heated devices including a main current controlling switch normally held closed, a thermostat, electrically governed means for opening said switch, means movable by the thermostat for causing the actuation of said first mentioned means to open the switch, and controlling means for varying the throw of said last mentioned means.

9. A temperature regulator for electrically heated devices including a main current controlling switch normally held closed, a shunt circuit controlled by said switch, a secondary switch in the shunt circuit, electrically actuated means controlled by the shunt circuit for opening the main switch, a thermostat, and an arm operable by the thermostat for closing the secondary switch.

10. A temperature regulator for electrically heated devices including a main current controlling switch normally held closed, a shunt circuit controlled by said switch, a secondary switch in the shunt circuit, electrically actuated means controlled by the shunt circuit for opening the main switch, a thermostat, an arm operable by the thermostat for closing the secondary switch, and means carried by said arm to coact with said first mentioned means for locking the main switch open coincident with the closing of the secondary switch.

11. A temperature regulator for electrically heated devices including a main current controlling switch normally held closed, a shunt circuit controlled by said switch, a secondary switch in the shunt circuit, an electromagnet in the shunt circuit, means for opening the main switch including an armature operable by said magnet, a thermostat, and means operable by the thermostat for closing the secondary switch.

12. A temperature regulator for electrically heated devices including a main current controlling switch normally held closed, a shunt circuit controlled by said switch, a secondary switch in the shunt circuit, an electromagnet in the shunt circuit, means for opening the main switch including an armature operable by said magnet, an arm carried by the armature, a thermostat, means operable by the thermostat for closing the secondary switch, and means carried by said last mentioned means and adapted to coact with said arm for locking the main switch open coincident with the closing of the secondary switch.

13. A temperature regulator for electrically heated devices including a main current controlling switch normally held closed a shunt circuit controlled by said switch, a secondary switch in the shunt circuit, an electromagnet in said circuit, means for opening the main switch and including an armature operable by the magnet, an arm carried by said armature, a thermostat, means shiftable by the thermostate to active position closing the secondary switch, and locking means carried by said last mentioned means and having its path of movement normally blocked by said arm to be flexed thereby when the switch closing means is moved to active position whereby said locking means will, when the armature is shifted, yieldably move to coact with the arm for locking the main switch open.

14. A temperature regulator for electrically heated devices including a main current controlling switch normally held closed, a shunt circuit controlled by said switch, a secondary switch in the shunt circuit, an electromagnet in said circuit, means for opening the main switch including an armature operable by said magnet, an arm projecting from the armature, a thermostat, a pivoted switch closing arm shiftable by the thermostat to active position closing the secondary switch, and a spring locking member carried by the switch closing arm and having said first mentioned arm normally disposed in the path of movement thereof for flexing said member when the switch closing arm is moved to active position whereby said member will, when the armature is shifted, yieldably move to coact with the arm of the armature for locking the main switch open.

15. A temperature regulator for electrically heated devices including a main current controlling switch normally held closed, electrically actuated means for opening said switch, means shiftable for causing the actuation of said first mentioned means, a thermostat, and an operative connection between the thermostat and said last mentioned means including a rocker arm, and means adjustable for shifting the pivotal center of said arm.

16. A temperature regulator for electrically heated devices including a main current controlling switch normally held closed, electrically actuated means for opening said switch, means shiftable for causing the actuation of said first mentioned means, a thermostat, and an operative connection between the thermostat and said last mentioned means including a rocker arm, a post, an eccentric carried by the post and having the arm journaled thereon, and means for adjustably rotating said post.

17. In a device of the character described, the combination of a switch normally held closed, a thermostat, electrically actuated means under control of the thermostat for opening the switch, and means for locking the switch open and mechanically connected with the thermostat to be released by contraction of the thermostat.

18. A device of the character described including a switch normally held closed, electrically governed means for opening the switch, means whereby the first means will automatically be actuated, and means governed by the second means for locking the switch open.

19. A device of the character described including a switch normally held closed, a thermostat, electrically governed means under the control of the thermostat for opening the switch, and means for automatically holding the switch open until the thermostat cools and releasable by the thermostat.

In testimony whereof I affix my signature.

DONALD H. McGOGY. [L. S.]